J. A. Marden,
Governor.

No. 82,729.    Patented Oct. 6, 1868.

Witnesses.
S. N. Piper
F. P. Hale Jr.

Inventor.
J. A. Marden
by his attorney
N. H. Eddy

United States Patent Office.

JEREMIAH A. MARDEN, OF BOSTON, MASSACHUSETTS, ASSIGNOR TO AUGUSTUS LYNCH AND REUBEN K. HUNTOON, OF SAME PLACE.

*Letters Patent No. 82,729, dated October 6, 1868.*

IMPROVEMENT IN GOVERNORS FOR STEAM-ENGINES.

*The Schedule referred to in these Letters Patent and making part of the same.*

TO ALL PERSONS TO WHOM THESE PRESENTS MAY COME:

Be it known that I, JEREMIAH A. MARDEN, of Boston, in the county of Suffolk, and State of Massachusetts, have made a new and useful improvement or invention having reference to Governors for Steam-Engines, or various other motors; and I do hereby declare the same to be fully described in the following specification, and represented in the accompanying drawings, of which—

Figure 1:
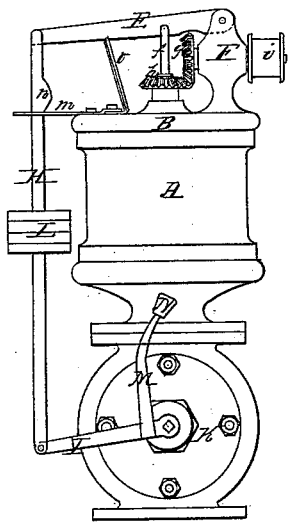
Figure 2:
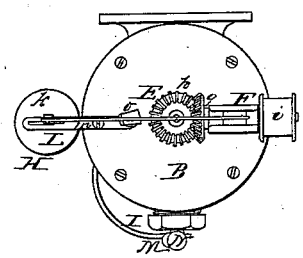

Figure 1 denotes a front elevation,

Figure 2 a top view, and

Figure 3:
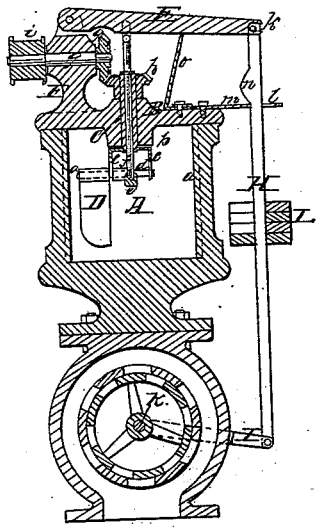
Figure 4:
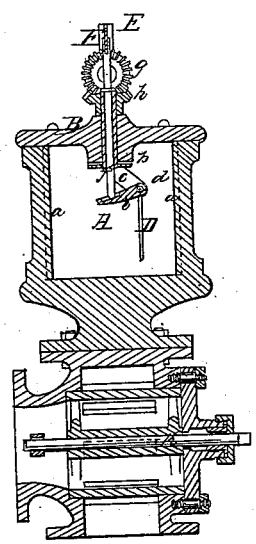

Figures 3 and 4 are vertical sections of a governor embodying my said invention.

In the said drawings, A denotes a cylindrical vessel, provided with a close-fitting cover, B. There may project from the inner curved surface of the vessel a series of ribs $a\ a$, although such are not absolutely essential to my invention. They may be termed useful auxiliaries, as they are intended as so many obstacles for preventing a liquid, when in such vessel, from being revolved by the rotary float (to be hereinafter described) while such float may be in motion or revolving around in the vessel, or the liquid thereof.

A tubular shaft, C, extending through the cover B, in manner as represented in figs. 3 and 4, supports, at its foot and below the cover, a plate or disk, $b$, from opposite parts of the circumference of which two curved arms $c\ c$ are projected laterally, they being parallel to each other.

These arms support a rocker-shaft, $d$, which turns freely in them, and extends beyond one of them, and has a float or paddle, D, fixed to and extended down from it, the whole being as represented. An arm, $e$, projects from the rocker-shaft, and has a spindle or rod, $f$, pivoted on it. This spindle slides freely through the tubular shaft, and at its upper end is forked to receive a lever, E, which is pivoted or jointed at one end to a standard, F, erected on the cover B.

The said standard supports a driving-shaft, G, having a bevel-gear, $g$, fixed on it to engage with a similar gear, $h$, fixed on the upper part of the tubular shaft C. A driving-pulley, $i$, is applied to the shaft G, and is to receive an endless belt proceeding from the steam-engine or motor with which the governor is to be employed, for the purpose of regulating its operations.

By revolving the shaft G, the shaft C will be put in revolution, and will cause the float or paddle D to travel around in a circular orbit or path within the liquid of the vessel A. The resistance of the liquid to the movements of the float will cause such float to turn upward, so as to incline more or less to the horizon. In so doing, the float will turn its shaft, and force upward the spindle and the lever E.

From the outer end of the said lever E, a rod or hanger, H, depends. The lower part of this hanger is to be jointed or pivoted to an arm, I, proceeding from the shaft K of a throttle-valve, or other proper valve arranged in the induction-pipe of a steam-engine, or such arm I may extend from the gate of a water-wheel.

A weight or series of weights, L, may be applied to the hanger, in order to counteract, as may be necessary, the tendency of the float to rise while in revolution.

As the said float, while being revolved, may depart from a vertical line, or its inclination to the horizontal plane may increase, it will meet with less resistance from the liquid. In order to compensate for this diminution of resistance, I apply to the valve-arm I, an arm, M, to project upward therefrom, in manner as represented, such arm M having a weight, N, fixed to its upper part. As the valve-arm is raised upward by the hanger, the weight N will be thrown beyond the vertical line passing through the axis of the valve-shaft. The further the said weight is thrown beyond the said vertical line, the greater will be its tendency to raise the valve-arm so as to aid in opening the valve. Thus the arm M and weight N become a mechanism for compensating for the diminution of the resistance of the water on the paddle, which results from the inclination of the said paddle.

The outer end of the lever E is forked to receive a pin, K, projecting from one side of the hanger H. The said hanger goes down through a slot, $l$, in a guide or arm, $m$, extending from the cover B. Furthermore, the hanger has a cam, $n$, arranged on it just above the said arm.

A bent standard, o, formed as represented, and arranged on the top of the cover B, is pivoted to the cover so as to be capable of being revolved horizontally thereon, in order that it may be used to support the lever E, in or about in a horizontal position, or be turned from underneath it, so as to allow the lever to fall below the top of the standard.

After the float may have been put in revolution, the standard o should be turned aside from underneath the lever E. Under these circumstances, should the belt of the driving-pulley break, as sometimes takes place, the lever will at once drop down, so as to cause the cam of the hanger to act against the next adjacent end of the slot l of the guide-arm, in a manner to move the hanger laterally and disconnect it from the lever, in which case the hanger will fall and close the throttle-valve, thus instantly shutting off the supply of steam, and thereby stopping the engine, and preventing the serious consequences liable to result from its continuance in operation.

I make no claim to a hydraulic governor, as constructed in any of the patents, or applications for patents, of Reuben K. Huntoon.

What I claim as my invention is as follows:

I claim the arrangement and combination of the float D, its arm e, the tubular shaft C, the spindle f, vessel A, and its cover B, as specified.

Also, the arrangement of the said float D, arm e, spindle f, tubular shaft C, lever E, and its hanger H, as set forth.

Also, the arrangement of the compensating-arm M, and weight N, valve-arm I, hanger H, lever E, spindle f, tubular shaft C, float D, arm e, and the vessel A, substantially as specified.

Also, the combination of the cam n, slotted arm m, and the movable standard o, with the hanger H, lever E, spindle f, tubular shaft C, float D, arm e, and the vessel A, substantially as set forth.

JEREMIAH A. MARDEN.

Witnesses:
R. H. EDDY,
F. P. HALE, Jr.